B. VESELY AND W. FAJMAN.
SHANK BUTTON MACHINE.
APPLICATION FILED AUG. 15, 1919.
1,353,680.
Patented Sept. 21, 1920.
5 SHEETS—SHEET 1.
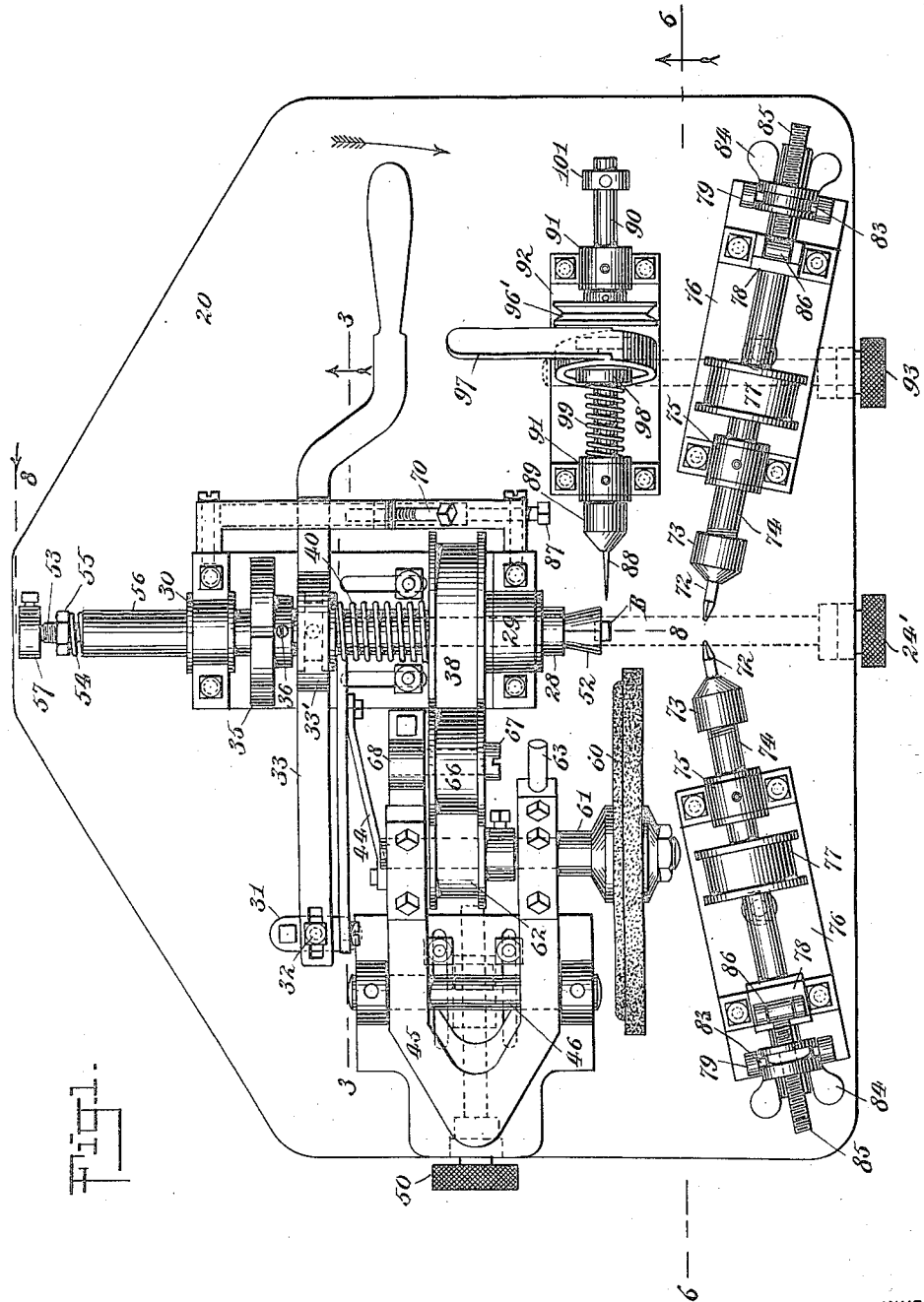
WITNESSES
INVENTORS
B. Vesely
W. Fajman
BY
ATTORNEYS B. VESELY AND W. FAJMAN.
SHANK BUTTON MACHINE.
APPLICATION FILED AUG. 15, 1919.
1,353,680.
Patented Sept. 21, 1920.
5 SHEETS—SHEET 2.
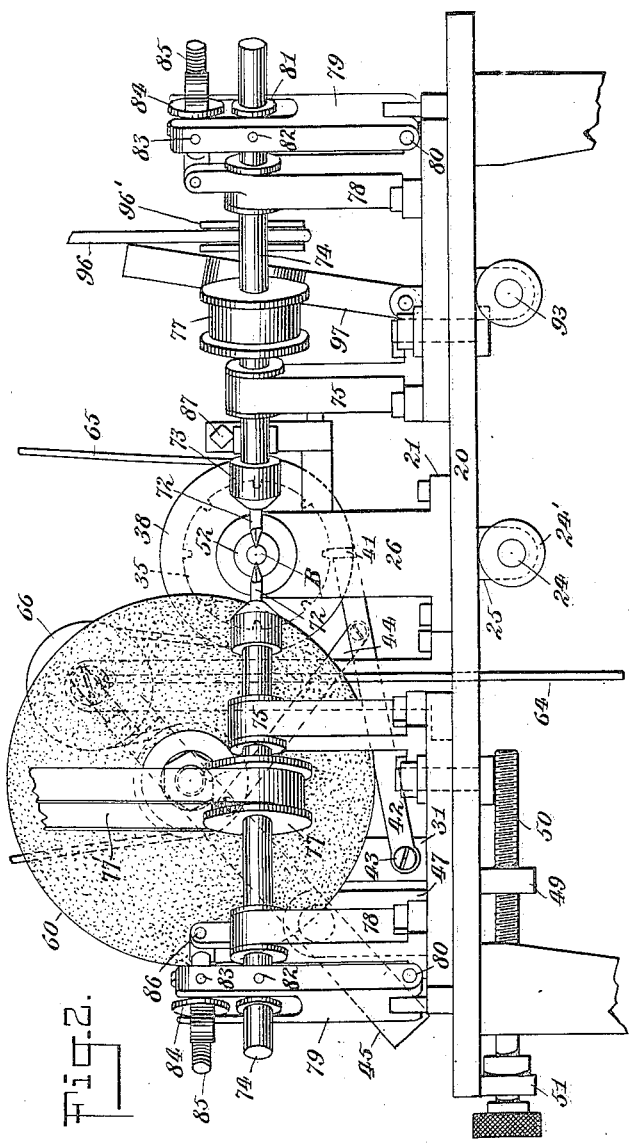
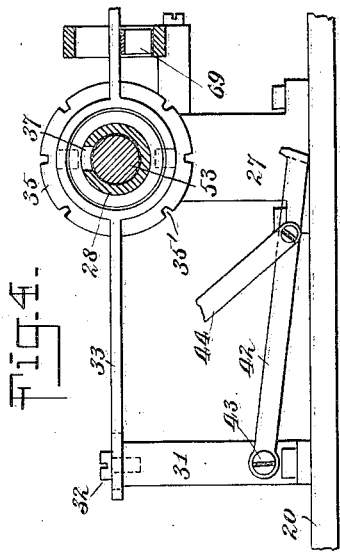
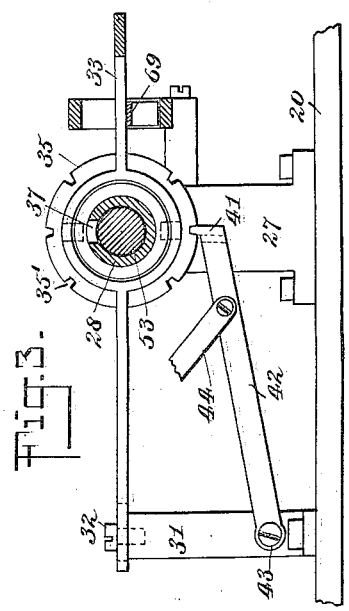
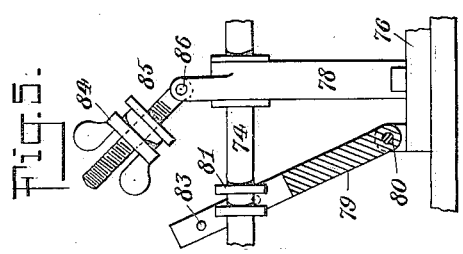
WITNESSES
William P. Goebel
Geo. W. Beeler
INVENTORS
B. Vesely
W. Fajman
BY
ATTORNEYS

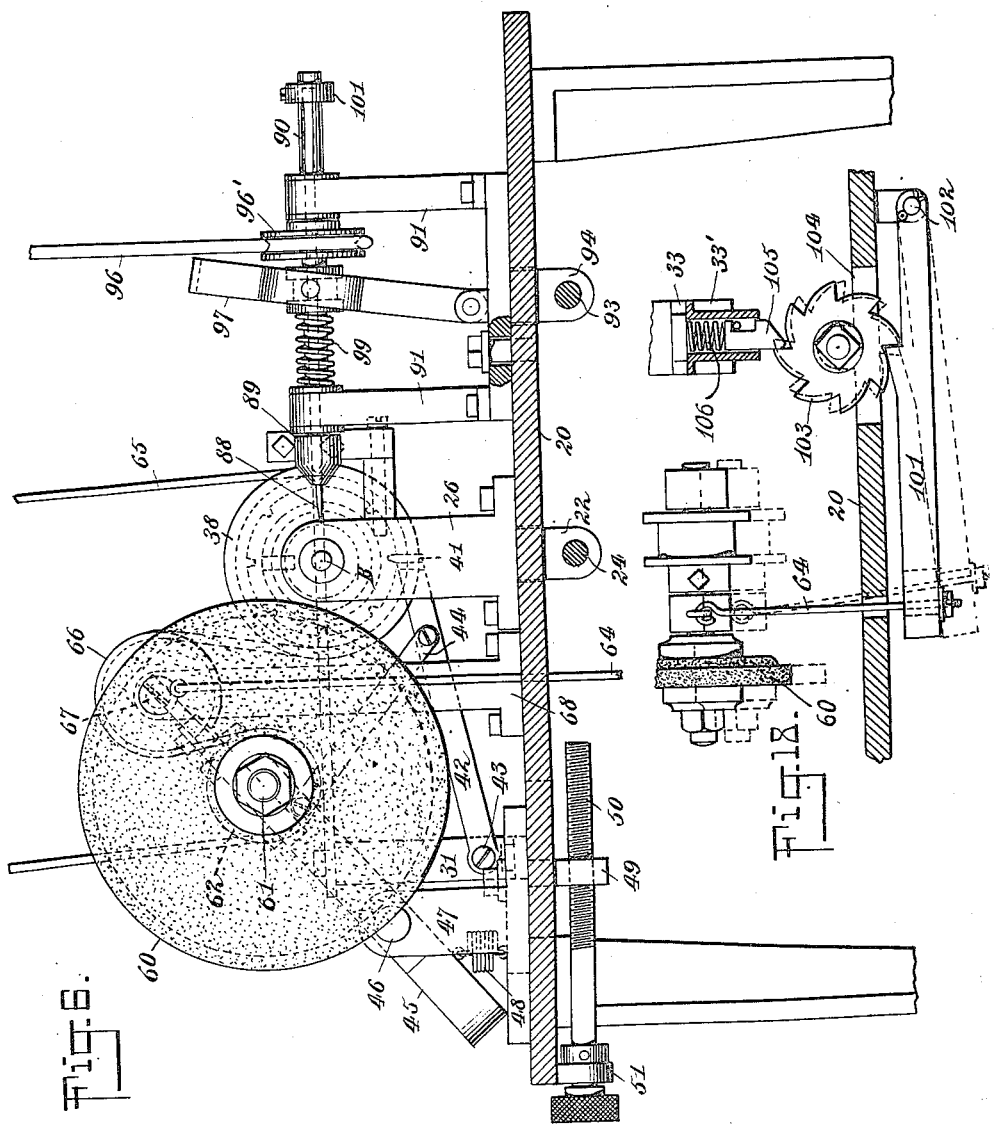

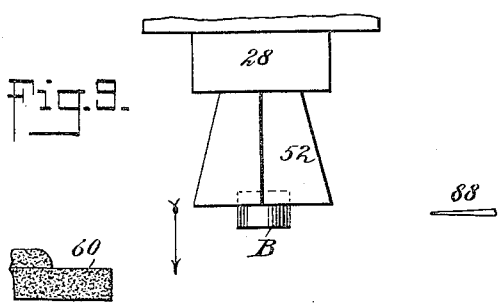
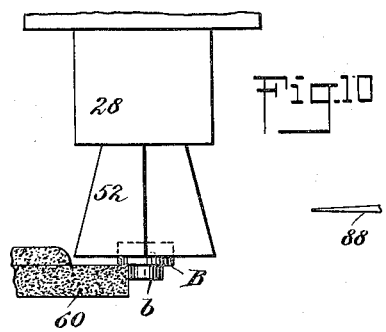
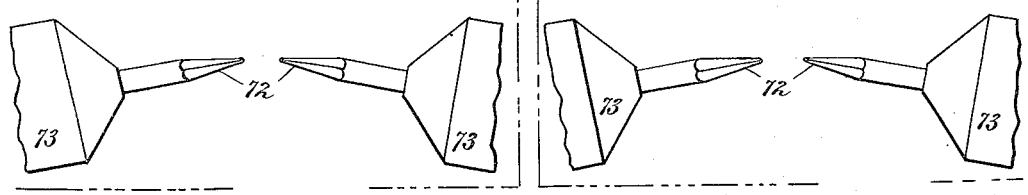
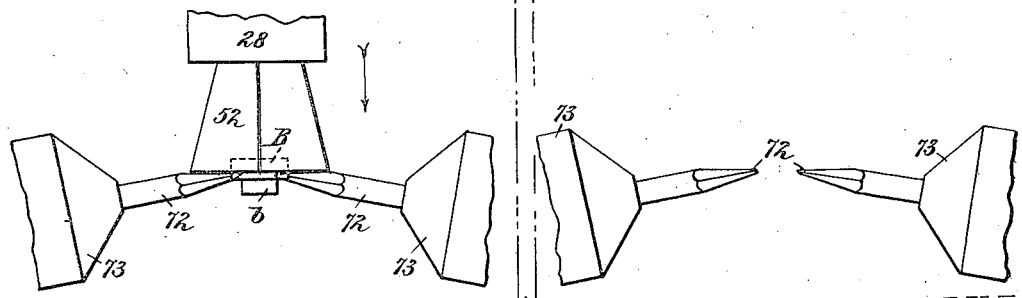
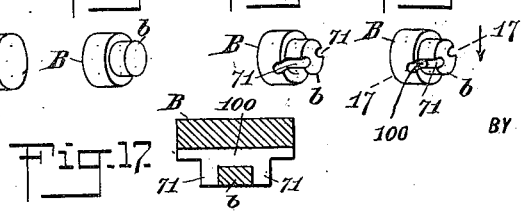

UNITED STATES PATENT OFFICE.

BEDRICH VESELY AND WILHEM FAJMAN, OF NEW YORK, N. Y.

SHANK-BUTTON MACHINE.

1,353,680. Specification of Letters Patent. Patented Sept. 21, 1920.

Application filed August 15, 1919. Serial No. 317,802.

*To all whom it may concern:*

Be it known that we, BEDRICH VESELY, a citizen of Bohemia, and a resident of the city of New York, (Astoria, borough of Queens,) in the county of Queens and State of New York, and WILHEM FAJMAN, a citizen of the United States, and a resident of the city of New York, (borough of Manhattan,) in the county and State of New York, have invented a new and Improved Shank-Button Machine, of which the following is a full, clear, and exact description.

This invention relates to button making machinery and has particular reference to means for forming shanks and drilling the eyes through the shanks of shank buttons such as are commonly made from clam shells, or other natural material, or its equivalent.

Among the objects of the invention is to provide a machine of a relatively simple, compact and reliable nature adapted for rapid manipulation by the one who has charge thereof and who during such manipulation will apply button blanks and shape and remove the finished buttons therefrom with rapidity and uniformity.

Another object of the invention is to provide a simple and reliable machine for routing the longitudinal grooves along the shank and the back of the button and for drilling the eye transversely through the shank in registration with the grooves without resetting the blank or button after it is once applied to the chuck, whereas in other machines heretofore proposed and used it is customary for the routing to be done on one machine and the drilling on another machine, requiring extra handling and setting of the button and with an accompanying loss of time and uniformity of result.

With the foregoing and other objects in view the invention consists in the arrangement and combination of parts hereinafter described and claimed, and while the invention is not restricted to the exact details of construction disclosed or suggested herein, still for the purpose of illustrating a practical embodiment thereof reference is had to the accompanying drawings, in which like reference characters designate the same parts in the several views, and in which Figure 1 is a plan view of our machine.

Fig. 2 is a front elevation of the same.

Fig. 3 is a vertical transverse section on the line 3—3 of Fig. 1.

Fig. 4 is a view of the same parts with changed position.

Fig. 5 is a detail view of the means for adjusting the routing tool.

Fig. 6 is a vertical transverse section on the line 6—6 of Fig. 1.

Figs. 9 to 12 are detail diagrams indicating the several stages of operation on the button blank with respect to the grinding, routing and drilling operations.

Figs. 13 to 16 are detail perspective views of the button blank or button corresponding to the respective stages in Figs. 9 to 12.

Fig. 17 is a horizontal section of the finished button on the line 17—17 of Fig. 16; and Fig. 18 is a detail of a modified means for controlling the cutting wheel.

Figure 7:
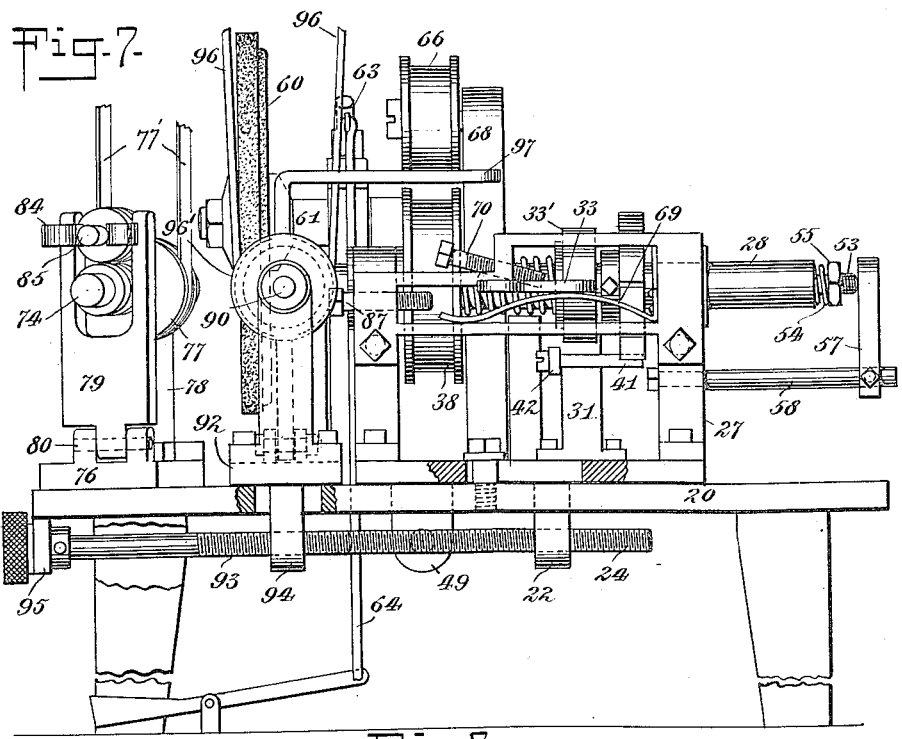
Fig. 7 is a side elevation but with parts broken away.

Referring now more specifically to the drawings we show our improved machine as comprising or built upon a base 20 of any suitable size or construction. Mounted in any suitable manner upon the upper surface of the base are suitable supporting devices for the operating parts of the machine. As indicated best in Fig. 8 the main support is indicated at 21 and provided with a lug 22 projecting downward through a slot 23 in the base for coöperation with an adjusting and locking screw 24 whose head 24' lies in front of the central portion of the base for easy manipulation. This screw is journaled in a bearing 25 whereby it is held from endwise movement. Consequently the rotation of the screw will cause a corresponding forward or rearward movement of the support 21 along the slot 23. Said support 21 carries front and rear bearing members or standards 26 and 27 in which is journaled a hollow shaft 28 which is adapted for longitudinal sliding movement in its bearings 29 and 30 as well as rotation therein.

At one side, preferably the left side of the shaft 28, is an upright post 31 to which is pivoted at 32 a hand lever 33 having a yoke 33' embracing a collar 34 fixed to the shaft 28 whereby the shaft 28 may be shifted endwise in its bearings. Just back of the collar 34 is a locking disk 35 fixed to the hollow shaft by means of a set screw 36. Extending forward from the collar the shaft is provided with a longitudinal slot 37. 38 is a belt wheel for rotating the shaft, the connection for this purpose between the wheel and the shaft being effected by a stud or screw 39 extending through the hub of the wheel into said slot. Provision is thus made for relative movement endwise between the wheel and the shaft. In other words with the wheel located just back of the front bearing 29 the shaft may be shifted forward by manipulation of the lever as indicated by the arrow on Fig. 1, and this movement is resisted resiliently by means of a spring 40 surrounding the shaft between the collar and the wheel. The disk 35 being locked to the shaft partakes of the same movements as the shaft or if the disk be held from rotation the shaft likewise will be so held, but the disk and shaft may be moved endwise while held from rotation. To this end we provide a blade-like member or keeper 41 carried by the free end of a lever 42 pivoted at its opposite end at 43 upon the standard 31. This keeper 41 is adapted to be received in any one of the notches 35' formed in the periphery of the disk 35 and when so located the disk and shaft are held from rotation. The length of the blade or keeper corresponds, however, to the free space in the slot 37 so that the blade does not resist the sliding movement of the shaft while it is in engagement with one of said notches. The lever 42 is connected as by means of a link 44 to a frame 45 journaled upon a pivot rod 46 carried by an auxiliary support 47. At the left side of the machine a spring 48 acts upon the frame 45 tending to swing the inner end thereof upward to bring the keeper 41 into engagement with the disk, the normal position. This auxiliary support 47 is adjustable laterally of the machine by means of a lug 49 and screw 50 journaled in a lug 51 at the left side of the main base.

52 indicates a chuck for holding a blank B. This chuck comprises a split end of a rod 53 fitted within the hollow shaft 28. The rear end of this rod is surrounded by an expansion spring 54 bearing at its rear end against a nut 55 threaded for adjustment on the rear end of the rod and bearing at its front end against a shoulder 28' formed by counter-boring the shaft at 56. The normal tendency of this spring is to force the rod rearward with respect to the shaft bringing the conical chuck portion of the rod into binding engagement with the front end of the shaft. At 57 we provide a stop extending upward from a bar 58 fixed in the rear bearing standard 27 and so located directly beneath the shaft 28. A set screw 59 serves to adjustably fix the stop upon the bar 58 to variably determine the distance thereof to the rear of the bearing standard 27. In the position indicated in Fig. 8 the spring 40 holds the collar 34 rearward causing the rear end or point of the rod 53 to contact the stop 57. The spring 54 at this time serves to hold the chuck gripped within the front end of the shaft 28 holding the button or blank B therein. If now the operator pushes rearward slightly upon the handle end of the lever 33 he will thereby force the shaft 28 rearward over the rear end of the rod 53 putting the spring 54 under additional compression and thereby the clutch will be released from binding position in the front end of the shaft and by their resiliency the jaws of the chuck will spring apart releasing the button and permitting the insertion of the next blank which will be gripped as a result of the releasing of the handle of the lever 33.

The first operation upon the blank is performed as will be appreciated from Figs. 9 and 10 by a grinding wheel or stone 60 fixed upon an arbor 61 journaled in the frame 45 above referred to. This arbor has attached to it a driving pulley 62. To one arm of the frame is fixed at 63 a rod or analogous connection 64 leading down through the base 20 for the attachment of a foot piece or treadle, see Fig. 7, but through which the frame 45 and the parts connected to the inner end thereof are swung downward around the axis of the pivot 46. 65 is a belt, or its equivalent, passing constantly over the wheel 38, the pulley 62 and an intermediate pulley 66 journaled on a fixed axis 67 on the upper end of a standard 68 just to the left of the front bearing standard 26. In the normal position of the frame 45 with the stone 60 elevated the belt 65 is sufficiently loose to slip freely over the wheel 38, it being remembered that in this position of the frame and stone the keeper 41 is engaged in one of the notches 35' of the disk 35, hence the shaft is held from rotation even though the belt may be in a certain degree of frictional contact with the wheel 38. When, however, the operator depresses the treadle and draws downward upon the connection 64 there are accomplished simultaneously at least three functions as follows: The keeper 41 is withdrawn from the disk, the pulley 62 is swung downward to produce sufficient tension on the belt to cause the driving of the wheel 38, and the stone 60 is swung into engagement with the blank as in Fig. 10. At about this time the operator will have pulled forward upon the lever 33 which at this time rides upon a bow spring 69 (see Fig. 7), until the lever strikes against the end of an adjustable stop screw 70. This spring serves to limit the movement to the right of shaft 28, under the action of the spring 40, before the lever 33 is pushed rearward, the lever having sufficient frictional contact with the spring for this purpose. The position of the screw 70 is such that when the lever is swung forward in a horizontal plane the shaft and chuck within it carry the blank B into the position shown in Fig. 10 where it will be engaged by the stone which at this time is rotating under the action of the belt 65 which also rotates at this time the shaft and blank through the wheel 38. The pulley 62 being smaller than the wheel 38 the stone will be rotated at a high surface speed relatively to the rotation of the blank. This action of the stone cuts the shank b.

The operator then releasing the treadle permits the stone to swing upward causing through the action of the spring 48 the loosening of the belt and the stopping of the rotation of the wheel 38 by virtue of the keeper 41.

The next operation is as shown in Fig. 11 to rout the grooves 71 in the button lengthwise along the shank and into the back of the button. The routing tools are shown at 72 which are essentially in the nature of drills, each mounted in a chuck 73 connected to a shaft 74 journaled for rotation and endwise movement in a main bearing 75 extending upward from a support 76 near the front corner of the base, one on each side. These shafts 74 are adapted to be rotated at high speed from any suitable overhead belts 77', but acting upon pulleys 77. 78 is an auxiliary bearing for the shaft 74, and adjacent to this bearing 78 is an adjuster comprising a fork or yoke 79 pivoted at 80 at the base of the support 76. 81 is a collar fixed to the shaft and embraced by the pins 82 of the yoke 79. Another pair of pins 83 embrace a winged nut 84 threaded upon a bolt 85 pivoted at 86 to the upper end of the auxiliary bearing 78. This adjuster serves to control or determine the longitudinal movement or position of the shaft 74 and routing tool 73 fixed thereto. These tools 72 are so fixed or adjusted as to have their points spaced from each other a distance corresponding to the space between the bottoms of the longitudinal grooves 71 along the sides of the shank b. Obviously the points of the routing tools will be shaped to produce the form of grooves desired in the button shank, and the axes of the routing tools are so inclined with respect to each other that the cutting sides of the tools operate to form the horizontal grooves in substantial alinement with each other. By the turning of the winged nuts 84 along the bolts 85 the points of the routing tools will be adjusted toward or from each other. If toward each other the depth of the grooves will be increased along both the shank and the main portion of the button, since during the routing of the grooves the button is held stationary and at a fixed position relative to the axis of the button chuck. This position is determined by the adjustment of the stop screw 87 against which the lever 33 is adapted to be swung forward after being depressed slightly to allow it to pass beneath the aforesaid stop 70, the lever being thin and flexible enough for this purpose. As shown in Fig. 11 the button is presumed to be moving forward and just about to reach the end of the forward thrust.

Figure 8:
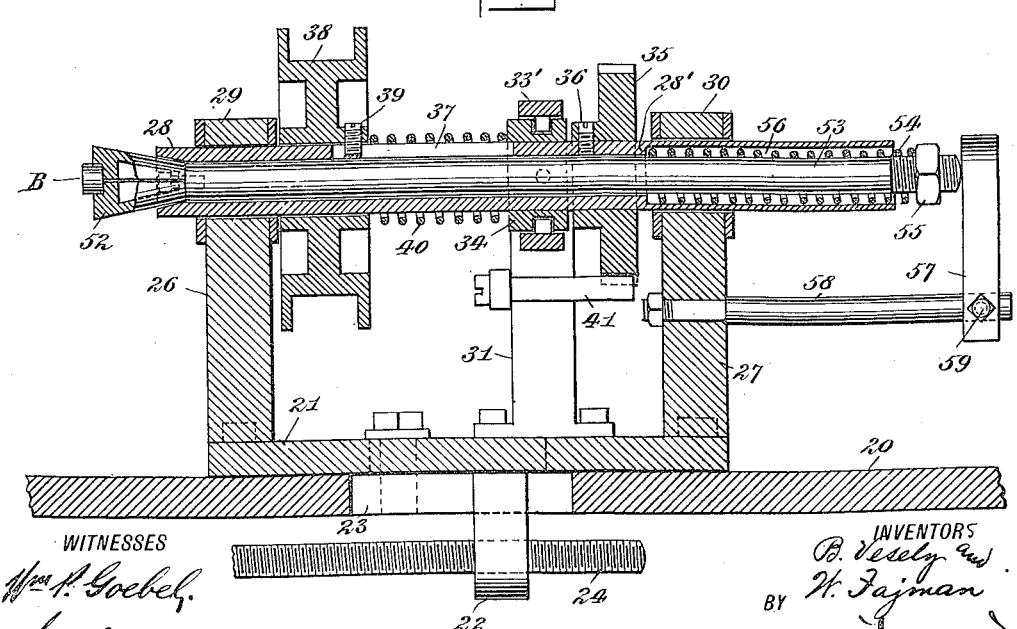
Fig. 8 is a vertical longitudinal section on the line 8—8 of Fig. 1.

After the grooves are routed the lever 33 is released and the spring 40 returns the parts to the normal position of Fig. 8 while the button is still held from rotation by the keeper 41. The drill 88 is then brought into action, it being carried by a chuck 89 at the end of a shaft 90 journaled in bearings 91 in a support 92 adjustable by means of a screw 93 acting through a lug 94. The screw 93 is journaled in a bearing 95 at the front right side of the base. (See Figs. 1 and 7). The shaft 90 is driven by means of a suitable overhead belt 96 operating over a pulley 96' located between the bearings 91. Adjacent to this pulley is a yoke 97 embracing a collar 98 fixed to the shaft and between which and the innermost bearing 91 is located an expansion spring 99 serving to normally hold the drill to the right of the button. The drill is maintained constantly in the plane of the axes of the routing tools so that the point of the drill is guided directly along the right horizontal portion of the groove 71 and thence through the shank coming out at the other side of the other horizontal groove forming a hole 100 substantially as indicated in Fig. 17. By the operation of the routing and drilling tools as set forth herein the work may be performed rapidly, easily and with the least possible likelihood of breaking or otherwise damaging the buttons. The movement of the drill in its drilling direction may be limited by any suitable means such for instance as by a stop collar 101 against one of the bearings 91 after the machine is properly adjusted, according to the size of the buttons operated upon. The manipulation of the machine may be carried forward by an unskilled laborer inasmuch as the depth of the several cuts will be predetermined making the machine at least semi-automatic.

After the eye 100 is drilled through the shank and the yoke or lever 97 is released, the spring 99 will throw it to the right out of the path of the mechanism and at this time the operator with his right hand maintained on the hand lever 33 will give a rearward thrust for the purpose of releasing the button, and with his left hand he will insert the next blank.

In Fig. 18 we show, instead of the pedal control, the cutting wheel 60 drawn downward by a lever 101, pivoted at 102 beneath the base 20, and actuated successively by the lever 33 through a cam wheel 103 journaled in a slot 104. A pawl 105, acted upon by a spring 106, and carried by the lever 33, rotates the cam wheel step by step.

In its normal position the keeper 41 engages the disk 35, holding the disk and shaft 28 from rotation, and at this time the frame 45 is held swung upward as shown in Fig. 6 by the spring 48 placing the driving wheel 62 in idle or non-driving position and thus permitting the belt 65 to slide over the pulley 38, which being fixed to the shaft is held stationary.

To insert a button blank into the chuck the operator standing in front of the machine, corresponding to the bottom of Fig. 1, pushes rearward upon the handle of the lever 33 causing the shaft 28, through the collar 34, to be pushed rearward over the inner shaft 53 and against the force of the spring 54, the inner shaft being held from rearward movement by the standard 57. The chuck 52 being carried by the inner shaft is thus allowed to open to receive the blank which is gripped and held by the chuck after the hand lever is released, the gripping action of the chuck being effected by the expansion of the spring 54. The lever 33 is then drawn forward bringing with it the shaft and button blank to the position of Fig. 10. The operator then swings downward the wheel or stone 60 to form the shank $b$, this downward swing of the stone being coincident with the tightening of the belt 65 and the rotation of the shaft and button. This forward movement of the lever is limited positively by the adjustable stop 70. The treadle is then released to permit the wheel 60 and frame 45 to swing upward to normal position and causing again the keeper 41 to hold the shaft and button from rotation. The operator now depresses the lever 33 against the leaf spring 69 to cause it to clear the stop 70 and swings it farther forward until stopped by the adjustable screw 87, bringing the button into position to be routed as shown in Fig. 11. At this time the routing tools 72 rotating at high speed form the grooves 71, and the adjustable stop 87 determines the length of such grooves. The lever is then released to permit the spring 40 to return the button to its normal position or to the plane of the drill 88 which by manipulation of the lever 97 will be advanced from its normal idle position of Fig. 1 into its active position of Fig. 12 drilling the eye 100. The lever 97 will then be released and returned to normal position by operation of the spring 99 completing the cycle of operations for said button which is removed for the successive reception of the next button in the manner above set forth.

We claim:

1. In a shank button machine, the combination of a holder for the button, a cutting device for coöperation with the button to form the shank, means to bring the button into cutting position, and means to rotate both the cutting device and the button simultaneously.

2. In a shank button machine, the combination of a shaft, means to hold a button on the end of the shaft, a rotatable cutting stone, means to move the stone into cutting position, means to move the shaft to bring the button into the path of the stone, and means to rotate the shaft simultaneously with the rotation of the stone.

3. In a shank button machine, the combination of a shaft, means to hold a button thereon, means to shift the shaft and button longitudinally, a cutting wheel movable in a certain plane into which the button is movable, and a single power member acting to rotate the wheel and the shaft simultaneously for cutting the shank on the button.

4. In a shank button machine, the combination of a button holder, means to bring the button so held into a cutting plane, a rotatable cutting device mounted in said plane, a frame in which the cutting device is journaled, a belt to rotate the button holder and the cutting device, and means acting simultaneously to bring the cutting device into engagement with the button and to tighten the belt.

5. In a shank button machine, the combination of a button holder adapted to hold a button in a definite plane, a swinging frame, a cutting wheel located in said plane, an arbor journaled in the frame supporting the cutting wheel, a wheel connected with the button holder, a pulley fixed to the arbor, and means to swing the cutting wheel in the plane aforesaid into engagement with the button, and means to tighten the belt to cause the rotation of the wheel and cutting wheel simultaneously as a result of the swinging of the cutting wheel.

6. In a shank button machine, the combination of a shaft, means to support the shaft for rotation and endwise slidable movement, hand operated means to shift the shaft endwise in one direction, automatic means to shift the shaft in the opposite direction, a wheel mounted upon the shaft for rotation therewith but relatively movable endwise thereon, a holding member fixed to the shaft, a keeper normally in engagement with the holding member to prevent the rotation of the shaft and wheel, and means acting to cause the rotation of the wheel and shaft and the release of the keeper.

7. In a shank button machine, the combination of a shaft, bearing supports for the shaft, means including a hand lever to move the shaft endwise, and positive stop means coöperating selectively with the lever to limit the endwise movement of the shaft at different points.

8. In a machine of the class set forth, the combination of a shaft, supports for the shaft permitting rotation and endwise movement thereof, a hand lever to move the shaft endwise, adjustable stop means coöperating selectively with the lever to limit the movement of the shaft at different points, and means to hold the shaft from rotation at either of said points.

9. In a shank button machine, the combination of a button holder, cutting means to form a shank on a button held in the holder, and routing means to form grooves longitudinally of the shank while the button is held in the holder.

10. In a shank button machine, the combination of a holder, routing means for forming grooves in the shank, and means to move the button holder relatively toward and from the routing means while the grooves are being formed.

11. In a shank button machine, the combination of a plurality of routing tools, means to hold and operate said tools in a definite position, a button holder, and means to move the button holder to bring the button into position to be acted upon by the routing tools.

12. In a shank button machine, the combination of a pair of routing tools and means to hold and rotate said tools with their axes in the same plane but at an angle to each other, a button holder, means to form a shank on a button while held in the holder, and means to bring the shank of the button so formed with its axis in the plane aforesaid to form simultaneously along the shank a pair of grooves by the routing tools.

13. In a shank button machine, the combination of a pair of routing tools, means to support and rotate said tools with their axes in a certain plane at an angle to each other, and means to bring a button with its shank along said plane and between the tools to form longitudinally of the shank a pair of oppositely arranged grooves and communicating transverse grooves along the back face of the button in a single continuous operation.

BEDRICH VESELY.
WILHEM FAJMAN.